(12) United States Patent
Chase

(10) Patent No.: US 10,839,684 B2
(45) Date of Patent: Nov. 17, 2020

(54) DIRECT VEHICLE ENGAGEMENT SYSTEM

(71) Applicant: Arnold Chase, West Hartford, CT (US)

(72) Inventor: Arnold Chase, West Hartford, CT (US)

(*) Notice: Subject to any disclaimer, the term of this patent is extended or adjusted under 35 U.S.C. 154(b) by 0 days.

(21) Appl. No.: 16/751,576

(22) Filed: Jan. 24, 2020

(65) Prior Publication Data

US 2020/0160705 A1    May 21, 2020

Related U.S. Application Data

(63) Continuation-in-part of application No. 15/973,987, filed on May 8, 2018.

(60) Provisional application No. 62/502,817, filed on May 8, 2017, provisional application No. 62/849,520, filed on May 17, 2019.

(51) Int. Cl.
| | |
|---|---|
| G08G 1/0968 | (2006.01) |
| G08G 1/00 | (2006.01) |
| G01C 21/34 | (2006.01) |
| B60W 60/00 | (2020.01) |
| G06Q 50/30 | (2012.01) |
| G05D 1/02 | (2020.01) |

(52) U.S. Cl.
CPC .   *G08G 1/096883* (2013.01); *B60W 60/00253* (2020.02); *G01C 21/3438* (2013.01); *G06Q 50/30* (2013.01); *G08G 1/202* (2013.01); *G08G 1/205* (2013.01); *B60W 60/0017* (2020.02); *G05D 1/021* (2013.01)

(58) Field of Classification Search
CPC .... G05D 1/0088; G05D 1/0011; G01C 21/26; G01C 21/3438; G08G 1/096883; G08G 1/202; G08G 1/205; B60W 60/00253; G06Q 50/30
See application file for complete search history.

(56) References Cited

U.S. PATENT DOCUMENTS

| | | | |
|---|---|---|---|
| 5,168,451 A | * | 12/1992 | Bolger ................... G08G 1/127 340/994 |
| 7,986,126 B1 | | 7/2011 | Bucci et al. |
| 8,630,897 B1 | | 1/2014 | Gomez et al. |
| 9,387,928 B1 | | 7/2016 | Gentry et al. |
| 9,412,280 B1 | | 8/2016 | Zwillinger et al. |

(Continued)

FOREIGN PATENT DOCUMENTS

WO   WO-2013164660 A1 * 11/2013 ............ H04W 4/023

OTHER PUBLICATIONS

Unknown, "How Much Does It Cost to Build a Taxi Booking App Like Uber?", published date unknown, retrieved Sep. 23, 2020, retrieved from https://theappsolutions.com/blog/development/cost-to-build-taxi-app/ (Year: 2020).*

(Continued)

*Primary Examiner* — Calvin Cheung
(74) *Attorney, Agent, or Firm* — McCormick, Paulding & Huber PLLC

(57) ABSTRACT

A direct vehicle engagement system, device and method that allows end-users to select a driven or autonomous vehicle from amongst a group of available, unassigned vehicles within a geographical area, and arrange an extemporaneous trip directly with the selected vehicle, eliminating the need for the involvement of a Central Operations Center or third party intermediary in the trip assignment and vehicle engagement processes.

25 Claims, 5 Drawing Sheets

(56) References Cited

U.S. PATENT DOCUMENTS

| | | | |
|---|---|---|---|
| 9,599,477 B1 | 3/2017 | Aula et al. | |
| 9,606,539 B1 | 3/2017 | Kentley et al. | |
| 9,715,233 B1 | 7/2017 | Mandeville-Clarke et al. | |
| 9,836,057 B2 | 12/2017 | Fairfield et al. | |
| 9,953,283 B2 | 4/2018 | Sweeney et al. | |
| 9,953,539 B1 | 4/2018 | Gkiotsalitis et al. | |
| 10,036,641 B1* | 7/2018 | Iland | H04W 4/02 |
| 10,082,793 B1 | 9/2018 | Glaser | |
| 10,147,325 B1 | 12/2018 | Copeland et al. | |
| 10,423,934 B1 | 9/2019 | Zanghi et al. | |
| 10,501,055 B1 | 12/2019 | Yi et al. | |
| 2004/0177109 A1* | 9/2004 | Lee | G08G 1/202 709/201 |
| 2005/0108089 A1 | 5/2005 | Ehrman et al. | |
| 2006/0034201 A1* | 2/2006 | Umeda | G06Q 30/02 370/310 |
| 2009/0088924 A1 | 4/2009 | Coffee et al. | |
| 2009/0313077 A1 | 12/2009 | Wheeler | |
| 2010/0023195 A1 | 1/2010 | Traster | |
| 2010/0161481 A1 | 6/2010 | Littrell | |
| 2012/0078672 A1 | 3/2012 | Mohebbi et al. | |
| 2012/0098483 A1 | 4/2012 | Patel | |
| 2012/0106801 A1 | 5/2012 | Jackson | |
| 2012/0200259 A1 | 8/2012 | Sullivan et al. | |
| 2012/0232943 A1* | 9/2012 | Myr | G06Q 10/04 705/7.13 |
| 2012/0280653 A1 | 11/2012 | Prosser et al. | |
| 2012/0330494 A1 | 12/2012 | Hendrix et al. | |
| 2013/0196638 A1* | 8/2013 | Kim | H04W 4/023 455/414.1 |
| 2013/0214737 A1 | 8/2013 | Wu et al. | |
| 2013/0282602 A1* | 10/2013 | Wang | G06Q 50/30 705/319 |
| 2013/0290040 A1* | 10/2013 | Perry | G06Q 50/10 705/5 |
| 2014/0026065 A1* | 1/2014 | Wang | G06Q 50/30 715/744 |
| 2014/0129143 A1 | 5/2014 | Dave et al. | |
| 2014/0132207 A1 | 5/2014 | Fisher | |
| 2014/0136414 A1 | 5/2014 | Abhyanker | |
| 2014/0156556 A1 | 6/2014 | Lavian et al. | |
| 2014/0222298 A1 | 8/2014 | Gurin | |
| 2014/0358353 A1 | 12/2014 | Ibanez-Guzman et al. | |
| 2015/0015193 A1 | 1/2015 | Oman et al. | |
| 2015/0035685 A1 | 2/2015 | Strickland et al. | |
| 2015/0081362 A1* | 3/2015 | Chadwick | G06Q 10/06311 705/7.14 |
| 2015/0206357 A1 | 7/2015 | Chen et al. | |
| 2015/0336270 A1 | 11/2015 | Storr | |
| 2015/0345951 A1 | 12/2015 | Dutta et al. | |
| 2016/0001883 A1 | 1/2016 | Sanz et al. | |
| 2016/0027306 A1 | 1/2016 | Lambert et al. | |
| 2016/0117610 A1 | 4/2016 | Ikeda et al. | |
| 2016/0138928 A1 | 5/2016 | Guo et al. | |
| 2016/0139594 A1 | 5/2016 | Okumura et al. | |
| 2016/0161266 A1 | 6/2016 | Crawford et al. | |
| 2016/0171574 A1* | 6/2016 | Paulucci | G07B 15/02 705/13 |
| 2016/0176307 A1 | 6/2016 | Becker | |
| 2016/0209220 A1 | 7/2016 | Laetz | |
| 2016/0301698 A1 | 10/2016 | Katara et al. | |
| 2016/0301808 A1* | 10/2016 | Choi | H04W 4/80 |
| 2016/0303969 A1 | 10/2016 | Akula | |
| 2016/0321566 A1 | 11/2016 | Liu et al. | |
| 2016/0321771 A1* | 11/2016 | Liu | G07B 15/00 |
| 2016/0334797 A1 | 11/2016 | Ross et al. | |
| 2016/0342915 A1 | 11/2016 | Humphrey | |
| 2016/0351056 A1 | 12/2016 | Herbach et al. | |
| 2016/0370194 A1 | 12/2016 | Colijn et al. | |
| 2017/0050749 A1 | 2/2017 | Pilskalns | |
| 2017/0052034 A1* | 2/2017 | Magazinik | G06Q 10/047 |
| 2017/0060129 A1 | 3/2017 | Ross et al. | |
| 2017/0102243 A1* | 4/2017 | Samocha | G06Q 50/30 |
| 2017/0103490 A1* | 4/2017 | Haparnas | H04W 4/023 |
| 2017/0123421 A1* | 5/2017 | Kentley | G01S 17/87 |
| 2017/0124506 A1* | 5/2017 | Khan | G06Q 30/0282 |
| 2017/0132934 A1 | 5/2017 | Kentley et al. | |
| 2017/0147959 A1 | 5/2017 | Sweeney et al. | |
| 2017/0161860 A1* | 6/2017 | Schultz | H04L 67/16 |
| 2017/0213165 A1 | 7/2017 | Stauffer et al. | |
| 2017/0269940 A1 | 9/2017 | Valasek et al. | |
| 2017/0344023 A1 | 11/2017 | Laubinger et al. | |
| 2018/0060827 A1* | 3/2018 | Abbas | G05D 1/0285 |
| 2018/0075754 A1 | 3/2018 | Salter et al. | |
| 2018/0108103 A1* | 4/2018 | Li | G06Q 10/06315 |
| 2018/0150772 A1 | 5/2018 | Ryan et al. | |
| 2018/0188731 A1 | 7/2018 | Matthiesen et al. | |
| 2018/0202822 A1 | 7/2018 | DeLizio | |
| 2018/0211541 A1 | 7/2018 | Rakah et al. | |
| 2018/0253109 A1 | 9/2018 | Fontaine et al. | |
| 2018/0308191 A1 | 10/2018 | Matthiesen et al. | |
| 2018/0323816 A1* | 11/2018 | Chaston | H04B 1/3827 |
| 2019/0079521 A1 | 3/2019 | Blum et al. | |
| 2019/0137290 A1 | 5/2019 | Levy et al. | |
| 2019/0197325 A1 | 6/2019 | Reiley et al. | |
| 2019/0197798 A1 | 6/2019 | Abari et al. | |
| 2019/0228375 A1 | 7/2019 | Laury et al. | |
| 2019/0228646 A1* | 7/2019 | Bermudez | G01C 21/26 |
| 2019/0251496 A1 | 8/2019 | DaCosta et al. | |
| 2019/0265703 A1 | 8/2019 | Hicok et al. | |
| 2019/0318159 A1 | 10/2019 | Blanc-Paques et al. | |
| 2019/0358818 A1 | 11/2019 | Kanitz | |

OTHER PUBLICATIONS

Karfopoulos et al., "A Multi-Agent System for Controlled Charging of a Large Population of Electric Vehicles", IEEE Transactions on Power Systems, vol. 28 (2), May 2013, p. 1196-1204, Sep. 11, 2012.

Chen et al., "Operations of a shared, autonomous, electric vehicle fleet: Implications of vehicle & charging infrastructure decisions." In: Transportation Research Part A: Policy and Practice. Dec. 2016 (Dec. 2016) Retrieved from <https://pdfs.semanticscholar.org/65e1/f6dc55122accfcdc3cabcdba5f6da35b2492.pdf> entire document.

International Search Report for International Application No. PCT/US2018/031617 dated Jul. 23, 2018.

Written Opinion for International Application No. PCT/US2018/031617 dated Jul. 23, 2018.

International Search Report for International Application No. PCT/US2018/031626 dated Jul. 13, 2018.

Written Opinion for International Application No. PCT/US2018/031626 dated Jul. 13, 2018.

International Search Report for International Application No. PCT/US2018/031637 dated Jul. 23, 2018.

Written Opinion for International Application No. PCT/US2018/031637 dated Jul. 23, 2018.

International Search Report for International Application No. PCT/US2018/031647 dated Jul. 23, 2018.

Written Opinion for International Application No. PCT/US2018/031647 dated Jul. 23, 2018.

* cited by examiner

DIRECT VEHICLE ENGAGEMENT SYSTEM

CROSS-REFERENCE TO RELATED APPLICATIONS

This application is a continuation-in-part application of U.S. patent application Ser. No. 15/973,987, filed May 8, 2018, which claims the benefit of U.S. Provisional Patent Application No. 62/502,817, filed May 8, 2017, each of which is hereby incorporated by reference in its entirety. This application also claims the benefit of U.S. Provisional Patent Application No. 62/849,520, filed May 17, 2019, which is hereby incorporated by reference in its entirety.

TECHNICAL FIELD

The present disclosure generally relates to direct vehicle engagement systems, devices and method and, more particularly, to direct vehicle engagement systems, devices and methods for real-time selection and engagement of an available ride-hail or ride-share vehicle within a geographical area without the need for an intermediary to assign or arrange the vehicle for the end user.

BACKGROUND

Traditionally, the customary focus of "for-hire" ride-hail or ride-share operators such as "Uber", "Lyft", as well as many livery services, has centered on "pre-arranged" trips where a user contacts a ride-hail service to arrange for a trip which results in a vehicle of the company's choosing being dispatched to a user-requested pickup location at a future, specified time. After the pick-up takes place, the dispatched vehicle then continues its trip to a previously designated destination location that had been previously selected by the user through the ride-hail service at the time the trip was arranged. While the trip request, vehicle matching, and dispatch to a location is ultimately accomplished, it is often less than ideal from both an efficiency as well as timing perspective. In many cases, available vehicles that were completely capable of fulfilling the ride-hail request at the time of the trip request were either passing by the requesting party and not identified as being available from a specific company, or available from another company or service, or available vehicles were not interested or were incapable in fulfilling the requested trip.

In many circumstances, such as when potential fares need a return trip from a live sporting event, concert, etc., it is impractical or impossible to properly set up such a trip in advance, especially when the ending time of the event is unpredictable or unknown. For example, the user from the above-provided example may have difficulty in arranging a return trip because the user is not able to know precisely when such a ride will be actually be needed to arrive at a pickup location, and as a result, the "return" trip from a location oftentimes cannot be arranged through a ride-hail service until an event is actually over, or is about to be over, creating a situation which ultimately results in ride-hail arrival delays, as well as resulting in a chaotic and inefficient pickup situations as potentially hundreds or thousands of vehicles all need to be hired virtually simultaneously, which inherently leads to logistical processing delays, a shortage of available vehicles, and creating a convergence of vehicles that "swarm" to a particular pickup location. Moreover, for events attending by large numbers of people, such as sporting events, or concerts, there is a risk of insufficient vehicles being available through a particular ride-hail service(s), for-hire service(s), as well as creating a resultant long delay waiting for a vehicle to become available through a particular ride-hail service(s). These issues typically create extremely difficult, inefficient, and frustrating booking experiences for users. Users are further frustrated when the multitude of hired vehicles simultaneously, or nearly simultaneously converge on a pickup location(s) in which a mass effort ensues as each individual fare attempts to identify their particularly hired vehicle from amongst a plethora of vehicles.

SUMMARY

In view of the limitations with the existing ride-hail services and methods for hiring and engaging a vehicle for a future trip request, there is a need for a system and method that allows end-users to bypass the need to initially set up a such a trip through a Central Operations Center or other third party intermediary (with the attendant need to specify an exact future pickup time), and instead provides for a user to select and engage a specific vehicle from amongst a multitude of available, unassigned vehicles within a certain geographical area, and extemporaneously set up a trip directly with a selected vehicle. Further, there is a need for a system and method that enables the rapid identification of any available, unassigned vehicles which then permits a direct, real-time engagement of such vehicles. Still further, there is a need for a system and method that filters and facilitates the identification of available, unassigned vehicles that additionally comply with one or more specific trip preferences such as, type of vehicle (sedan/SUV), category of vehicle (Taxi/Uber/Lyft/Private), size of vehicle, seating capacity of vehicle, seating configuration of the vehicle, available operating range of the vehicle, charge/gas level of the vehicle, cost/price of a trip, or the existence of special accommodations (e.g., handicap accommodations, etc.). Accordingly, the present disclosure provides a direct "user to vehicle" real-time ride-hail engagement system and method that improves upon conventional ride-share services and methods that are currently available in commerce and that overcome the problems and drawbacks associated with such conventional ride-hail services.

The present disclosure provides Direct Vehicle Engagement Systems (DVESs), devices and methods. The DVES uniquely improves upon conventional ride-hail services and overcomes the problems and drawbacks generally associated with such services by directly providing a user with 'real-time' ride-hail vehicle identification and engagement from nearby unassigned and available for hire vehicles. Moreover, a DVES in accordance with the present disclosure provides two variations on the basic ride-hail service and method of hiring a vehicle: an "Ad-hoc" method; and a "Queue" method.

In a DVES of the present disclosure, there is no need for a user to contact and pre-arrange with a ride-hail service in order to have a particular vehicle selected, accepted, and sent to their location, and then to require the user to subsequently attempt to search for and identify the particular vehicle from amongst a plethora of other similar vehicles in the same geographical area proximate to the user. With a DVES, any available, unassigned vehicle within a certain proximity relative to the user may be directly and remotely readily identified and selected by a potential fare, in real-time, on the spot, with no need for a user to communicate with a "third party" central/off-site control system, such as a Central Operations Center, or a corporate call center, in order to set up a trip. With the DVES, the entire process for a trip engagement is entirely between a user and a vehicle that is selected by that user. The DVES could work equally well with either driven or autonomous for-hire vehicles that have been equipped with DVES-designated equipment in accordance with the present disclosure, or compatible equipment.

In an "Ad-hoc" Mode in accordance with the present disclosure, an individual (or end user) that has not already arranged a trip or pickup by a ride-hail service could utilize the DVES to identify and engage available, unassigned vehicles located within a geographic area relative to the individual. As noted, the engagement of a vehicle would occur in real-time and would not require the user to have previously gone through a Central Operations Center or a third-party intermediary to engage and have a vehicle assigned for a particular trip request.

In preferred embodiments, the individual would utilize a user mobile device, more preferably provided with a DVES application, that would assist a user in identifying available vehicles and facilitate the engagement of an available vehicle for a trip. In such an "Ad-hoc" embodiment of the DVES, a user just needs to be in an area where unassigned/available "for-hire" vehicles have been directed, pre-positioned, or were driving by and/or waiting for a fare.

Such "for-hire" vehicles may be operating "stand-alone" (e.g., independently) or may be associated with a for-hire ride-hail service, and may be amongst or clustered with other ride-hail vehicles near a venue having sizeable crowds that are looking to hire a vehicle for transportation away from that venue. In accordance with the present disclosure, a user would no longer be required to go to a specific aggregation location (i.e., formal designated pickup areas) to find "for-hire" vehicles, and instead could simply identify and engage any available, unassigned vehicles in proximity to, passing by, or near the user's existing location.

In some embodiments, the DVES includes digitally modulated infra-red emitters (or beacons or signaling beacons), which allow individual vehicles to be differentiated to a handheld or other device. The emitters may operate at individually modulated frequency rates, with embedded data streams which allows various simultaneous transmission of information of conditions or parameters, such as general vehicle characteristics (e.g., taxi-cabs, private services, etc.).

In some embodiments of the present disclosure, available for-hire ride-hail or other for-hire vehicles would transmit a signal through a modulated infra-red (IR) or visible-light beacon indicating to nearby mobile devices the vehicle(s) availability status, company affiliation (if any), specific features such as, category of vehicle, seating capacity, etc. Further, the identification of available vehicles to a user would utilize different augmented graphics provided on a user's mobile device which would readily indicate not only the availability status of vehicles within a visual proximity to the user mobile device, but also any affiliation with existing ride-share, ride-hail or taxi companies.

The emitters would typically be mounted on the roofs of vehicles or may be mounted on short masts for additional elevation. Additionally, supplementary emitters that are directed in a forward or sideward direction may also be utilized in parallel with the main beacon to enhance the transmission presence and range of a vehicle to handheld devices.

The emitters may optionally utilize various optical and shielding elements to further optimize their transmission range, as well as incorporate internal heaters to enhance operation in snowy and other winter conditions. Other communication/signaling devices may be used to transmit information between available vehicles and the user's mobile device.

In a "Queue" Mode, an individual may utilize the DVES to in real-time display, choose from, confirm, and directly engage any pre-positioned available, unassigned vehicle that may be amongst or proximate to other unassigned available, for-hire vehicles in a generally designated static queue area. Additionally, unassigned for-hire vehicles that are marshalled in, or are a part of a formal "next-up vehicle" line, analogous to a traditional taxi-cab stand or "queue" line, may be randomly selected, confirmed, and engaged directly from a handheld device that use the DVES. During operation of the DVES "Queue" Mode, in addition to vehicle(s) transmitting a non-visible infra-red availability signal to prospective users handheld devices in order to readily identify available vehicles through a handheld device application (or "app"), the vehicle(s) could additionally include a visible display of its availability status. Having both infra-red as well as visible transmissions, a vehicle could be engaged by either a user using a DVES application on a user mobile device, or directly physically engaged by any person approaching and entering a vehicle in a queue line that is visually indicating its availability. Thus, a user can directly engage an available vehicle based on either a received IR signal, or a visual display, or both, without requiring the involvement of a third-party or ride-hail company.

Once an available for-hire vehicle has been engaged by the DVES app, the vehicle would change its availability status (by both IR and visible indication) to "unavailable", thus precluding a duplicate engagement attempt by any other user for the same vehicle. This change in availability status could be automatically and/or immediately accomplished by the DVES.

The direct engagement of a vehicle through DVES would occur in real-time, and be effectuated without the involvement of a ride-hail service and the attendant need for the user to first arrange for a trip through a Central Operations Center or a third party intermediary in order to have a vehicle assigned via a trip request.

The DVES in accordance with the present invention could be optimized for use with autonomous vehicles, where preferably a user can interact with such an autonomous vehicle using a user mobile device, more preferably equipped with a DVES application for identifying available vehicles, selecting an available vehicle, and engaging the selected vehicle using the user mobile device. Notwithstanding, the DVES could also easily accommodate the same direct and instant engagement process with driven vehicles as well without departing from the spirit and principles of the present disclosure.

Unlike "traditional" ride-hail systems, such as "Uber" and "Lyft", as well as livery services, in which a system or dispatcher pre-assigns a service-selected vehicle for a requested ride, the DVES in accordance with the present disclosure would put the choice of a specific vehicle and the engagement process entirely in the hands of the user without the delay or complications inherent in third-party services. Optionally, automatic acceptance by the selected available vehicle could eliminate delays due to acceptance risk by a driver.

Unlike "traditional" ride-hail systems that typically only utilize vehicles from within their own fleet of owned or contracted vehicles, a DVES in accordance with the present disclosure may accommodate an unlimited number of separately owned/separately operated/independently-owned vehicles within the same physical geographic area in the engagement process without limitation as to a particular vehicle's ownership or arrangement with a particular ride-hail service. Of particular note is the ability of DVES to greatly enhance "traditional" taxi service by allowing any taxicab equipped with DVES equipment to functionally be on par with ride-hail services in many situations.

With DVES, each compatible taxicab or "black car" would now be able to give hailing parties enhanced hailing abilities (e.g. faster, safer hailing) as well as bringing hailing parties a much easier way to determine and 'claim' any nearby 'available' cab without the awkward ambiguity and conflict that often exists now amongst multiple hailing parties when physically hailing. For example, with DVES, only the legitimate party that first engaged a taxicab could utilize that particular taxicab due to a confirmation code requirement.

A direct vehicle engagement system in accordance with embodiments of the present disclosure includes a beacon associated with a vehicle, and a mobile device. The beacon is configured to transmit an availability status signal, the availability status signal indicating whether the vehicle is available for hire or not available for hire. The mobile device is configured to receive the availability status signal.

A direct vehicle engagement device in accordance with embodiments of the present disclosure includes a mobile device having a display. The mobile device is configured to receive an availability status signal transmitted from a beacon of a vehicle.

A method of directly engaging a vehicle in a direct vehicle engagement system in accordance with embodiments of the present disclosure includes: transmitting, by a plurality of vehicles, an availability status signal, each availability status signal indicating whether the respective vehicle of the plurality of vehicles is available for hire or not available for hire; receiving, by a mobile device, each availability status signal of the plurality of vehicles; selecting, by a user of the mobile device, a desired vehicle indicated as being available for hire by the availability status signal transmitted by the desired vehicle; and preliminary engaging, by the mobile device, the desired vehicle for hire.

These and other objects, features and advantages of the present disclosure will become apparent in light of the detailed description of embodiments thereof, as illustrated in the accompanying drawings.

BRIEF DESCRIPTION OF THE DRAWINGS

The foregoing summary, as well as the following detailed description, is better understood when read in conjunction with the appended drawings. For the purpose of illustrating the invention, exemplary embodiments are shown in the drawings, it being understood, however, that the present application is not limited to the specific embodiments disclosed in the drawings.

DETAILED DESCRIPTION

Figure 1:
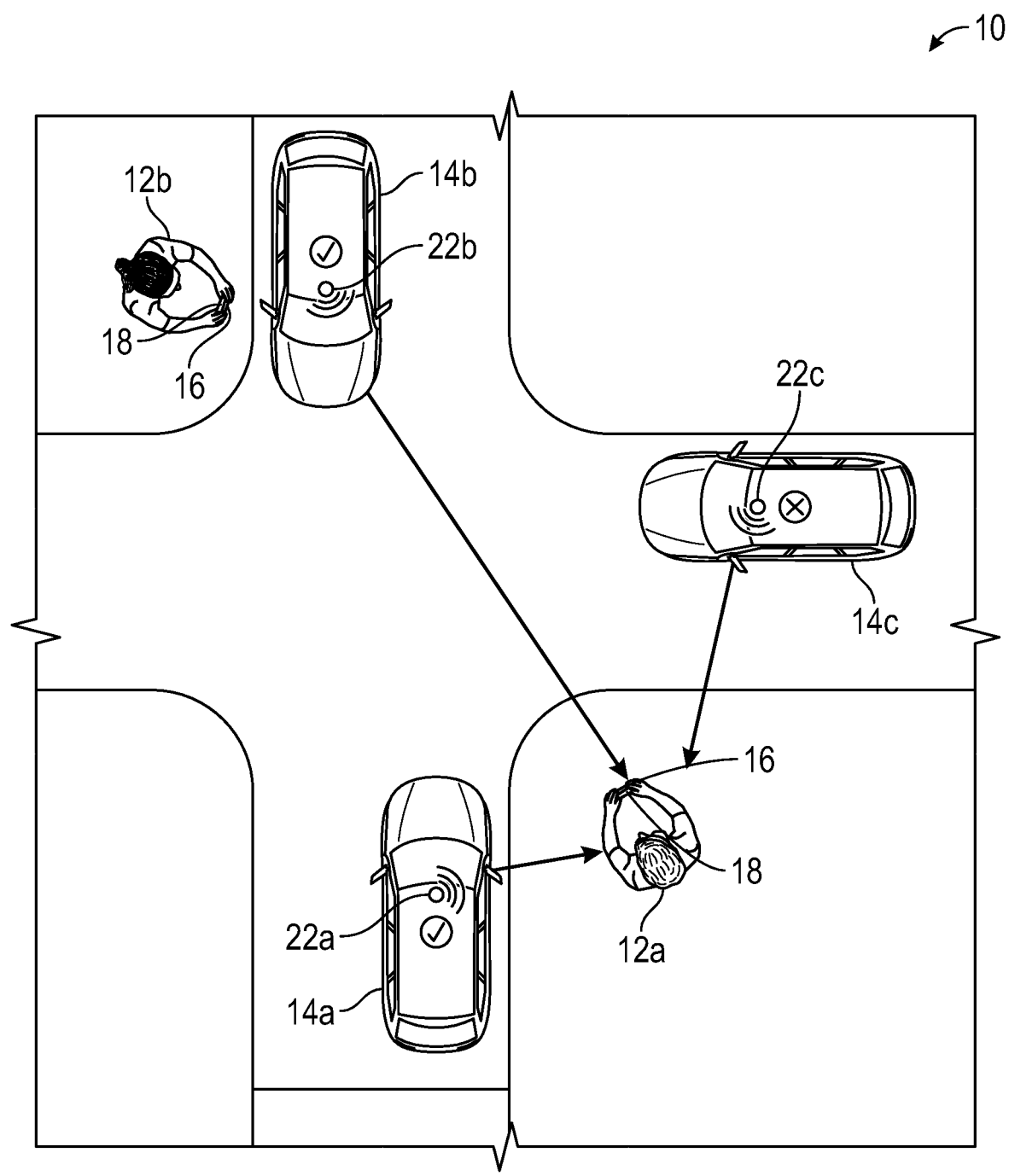
FIG. 1 shows an exemplary Direct Vehicle Engagement System (DVES) in accordance with the present disclosure.

Before the various exemplary embodiments are described in further detail, it is to be understood that the present invention is not limited to the particular embodiments described. It is also to be understood that the terminology used herein is for the purpose of describing particular embodiments only, and is not intended to limit the scope of the claims of the present application.

In the drawings, like reference numerals refer to like features of the systems and methods of the present disclosure. Accordingly, although certain descriptions may refer only to certain figures and reference numerals, it should be understood that such descriptions might be equally applicable to like reference numerals in other figures.

The present disclosure provides a Direct Vehicle Engagement System (DVES), designated as reference numeral 10, that allows a user of a handheld device that is running a DVES application to randomly select (or arbitrarily select) any available "for-hire" vehicle, either operating by itself, or co-located within a group of other for-hire vehicles within a select area, and extemporaneously engage and directly set up an trip with an available vehicle of interest without having to engage a ride-hail service to create the trip. The "select area" may be a visually perceptible area, an area within a selected physical distance from the user, or an area within a selected device communication distance from the user. The DVES 10 and method provides two general variations: an "Ad-hoc" Mode, and a "Queue" Mode. With the "Ad-hoc" Mode, generally illustrated in FIG. 1, a user 12 that wishes to engage the services of a ride-hail vehicle 14 could utilize the DVES 10 to self-identify and self-engage available, unassigned vehicles 14 located within the selected area or range of the user 12. With the "Queue" Mode shown in FIG. 5, a user 12 could utilize the DVES 10 to identify, select, confirm, and engage a desired available, unassigned vehicle 14 either pre-positioned in a designated area or in a formal "next-up" line, analogous to a traditional taxi-cab stand or "queue". Any engagement of a vehicle 14 according to either Mode would occur in real-time and would not require the user 12 to go through a Central Operations Center or a third-party intermediary to have a vehicle 14 assigned to a trip request.

Referring to FIG. 1, an exemplary embodiment of the DVES 10 is shown. In this embodiment, a user 12 is shown at a street corner using a mobile device 16 to identify and engage available, unassigned vehicle(s) 14 in general visual proximity to the user 12. As illustrated, the user 12 generally has a user mobile device 16, such as a cellphone, smart phone, tablet device, or the like, with which the user can access a DVES application 18 to identify available, unassigned vehicles 14 within a visual geographic proximity to the user 12. For illustration purposes, FIG. 1 shows vehicles 14a, 14b and 14c, of which vehicles 14a and 14b are currently available (as designated by a check mark) and unassigned, while vehicle 14c is unavailable (as designated by an "X").

Figure 4:
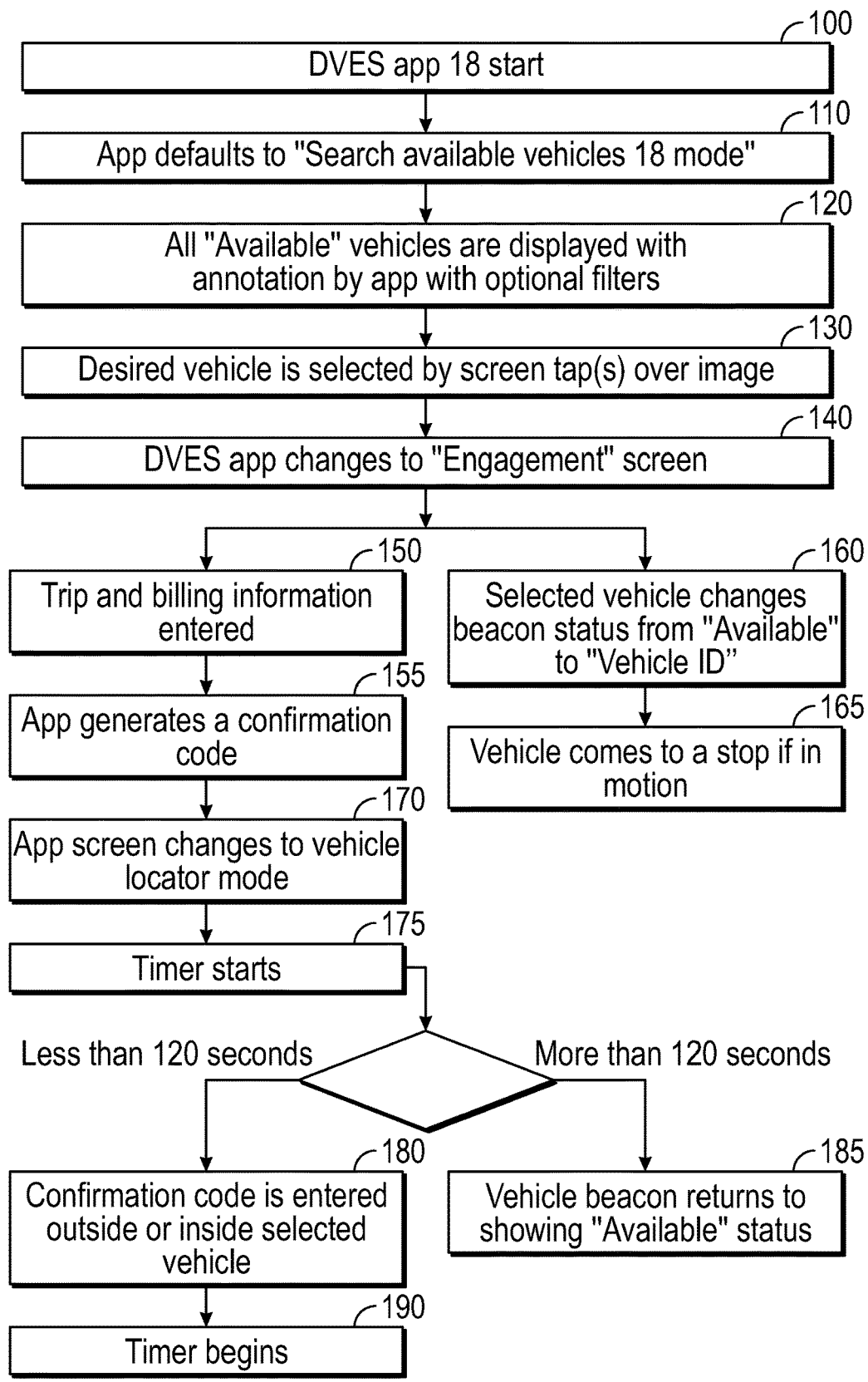
FIG. 4 is an exemplary flow diagram describing operation of the DVES in an "Ad-hoc" Mode in accordance with the present disclosure.

In the "Ad-hoc" Mode of the system 10, an exemplary embodiment of which is shown in the flow diagram of FIG. 4, the user 12 first accesses the DVES application 18 on the user mobile device 16 (Block 100). In accordance with preferred embodiments, the camera of the user mobile device 16 is activated and provides a video overview of the nearby vehicles 14 in the application's "search" mode Block 110). In preferred embodiments, the DVES application 18 defaults immediately to search for and visually highlight and/or annotate all available, unassigned vehicles 14 located within a geographical area proximate to the user 12 (Block 120). In embodiments of the DVES application 18, by pointing the user mobile device 16 in various directions, the user 12 can select the geographical area to be searched within visual range. In the "search" mode of the DVES application 18, the camera looks for, and identifies, any and all available, unassigned vehicles 14 within the geographic proximity to the user's location. All "available" for-hire vehicles 14 are displayed and differentiated on the screen or display 20 of the user mobile device 16 (Block 120). The mobile device 16 could be configured to dynamically display a video on the display 20 based on detections by the camera. Thus, the mobile device 16 could be configured to highlight and/or annotate the vehicles 14 on the display 20 based on the availability status signal.

Additional information details regarding the vehicle(s) 14 could be provided on the screen 20, for example, in accordance with such vehicle information provided by the vehicle 14 along with the availability signal. Based on such additional provided information, the user 12 could input conditional trip parameters, and the DVES application 18 would then either "grey-out" (or disregard) those vehicles that do not comply with the desired characteristics, or display those vehicles that match preselected parameters with highlighting or other visual augmentation amongst those vehicles 14 originally designated as being "available". Even if some initial filtering was already selected (e.g., by range) with symbols such as "$", "$$", and "$$$" appearing above the available vehicles, even within a screen already filtered for some criteria, the symbols would further allow a user with their selection process to "post filter" the displayed vehicles by factoring individual prices, etc. into the selection process. Further, by using different highlighting colors, for example, the user could further make a selection based on type of vehicle service, e.g., Uber, Lyft, Taxicab, etc.

In accordance with embodiments of the present disclosure, each vehicle 14 includes a DVES beacon 22 (or emitter or signaling beacon) which transmits an availability status signal. Each beacon 22 may include a housing(s), lens(es), emitter(s), shield(s), heater(s), receiver(s) and necessary circuitry for transmitting/receiving signals. In some embodiments, the beacon 22 comprises the receiver(s). In some embodiments, the receiver(s) is standalone or separate from the beacon 22. The signal transmitted by the beacons 22 may be constantly (or substantially constantly) transmitted, regardless of whether the vehicle 14 is available or unassigned. Such signals are preferably transmitted by digitally modulated infra-red or other spectral emissions and optionally through a fixed visible indication (such as a red or green light which appears to be steadily on, but in reality is digitally modulated too fast for the eye to perceive). The DVES application 18 searches for any and all vehicles 14 that are actively transmitting a digitally modulated infra-red or visible "I am available" signal. When the DVES application 18 senses (or detects) one or more vehicles 14 with this signal, the application 18 may either highlight those vehicles on the screen 20 of the user mobile device 16 and/or annotate all such vehicles 14 that are transmitting this signal status (i.e., "available" vehicles), and/or grey-out those vehicles 14 that are not transmitting this availability code (i.e., "unavailable" vehicles). The DVES application 18 could also be capable of providing additional visual, audible, and/or haptic alerts indicating the availability status of each vehicle 14 within the geographic proximity to the user 12 (such as, superimposing visual graphics on the screen 20 that point with visually augmented arrows 24 or the like to each vehicle 14 that is transmitting this signal and is therefore "available" for selection and trip engagement). This identification process is preferably dynamic, and as any new vehicles 14 with this signal becomes available, they are instantly (or substantially instantly) automatically added to user mobile device's screen 20 or augmented display along with optionally sounding an audible signal, while conversely each vehicle 14 that becomes assigned or otherwise stops transmitting the "availability" code will have its availability status altered and have its augmentation graphical treatment removed from the search/identification display process.

Figure 2:
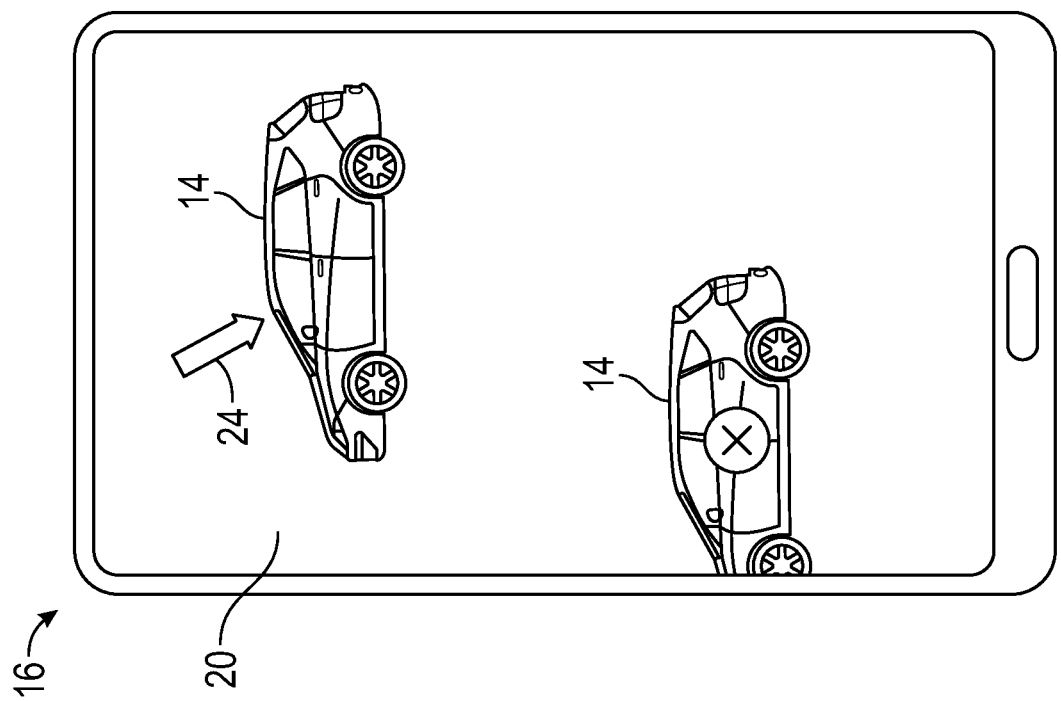
FIG. 2 is an exemplary representation of the screen of a user mobile device illustrating use of the DVES in accordance with the present disclosure.

Referring to FIG. 1, the user 12 receives signals from the vehicles 14a and 14b indicating that they are available for selection and engagement. However, the vehicle 14c transmits a signal to the user indicating that the vehicle 14c is currently unavailable. This information can be displayed on the screen 20 of the user mobile device 16, as shown in FIG. 2. As soon as the vehicle 14c becomes available—for example, an engaged passenger reaches his or her destination and leaves vehicle 14c—the signal transmitted to user 12 immediately (or substantially immediately) would change to an "I am available" signal. Similarly, if vehicle 14b is selected and engaged by another user 12b, then the signal transmitted from vehicle 14b immediately (or substantially immediately) would change to an "unavailable" signal, and the user mobile device 16 would be alerted to such a change and the user 12 cannot select the now-assigned vehicle 14b.

In the basic embodiment of the "search" mode, the user 12 could be provided with a search screen 20 showing all available vehicles 14 (Block 120). In some embodiments, as noted above, the user 12 may select different "filtered" trip conditions or parameters that narrow the display on the screen 20 to show, for example, only those highlighted or annotated vehicles 14 that meet a desired selected trip condition or parameter(s). For example, a user 12 can filter the "search" to show just those vehicles 14 within the proximity with an available travel range ability of greater than "x" miles, or only vehicles 14 with "x" number of seats, or only vehicles 14 with a certain seating layout, or only vehicles 14 with special equipment such as for handicapped persons, or just those vehicles that are from specific categories (i.e. just taxicabs, or just private vehicles, etc.). In use, the user 12 would select desired filter parameters via the user mobile device 16 prior to the search screen being engaged. The vehicles 14 would normally transmit such data along with the availability signal via the DVES beacons 22. Conditions and/or parameters of each vehicle 14 may be set in advance by the driver of the vehicle (or administrator/operator if the vehicle is an autonomous vehicle), which would be reflected in the data stream transmitted by the beacon 22 of the vehicle 14. For example, a driver, administrator or operator could set a maximum number of allowed passengers, a maximum/minimum possible trip distance or radius, a minimum fee amount, smoking/non-smoking cabin policy, etc. for the vehicle 14. The DVES application 18 could allow a user 12 the choice of selecting one or more filters (e.g., trip conditions or parameters) which would limit the identification of available vehicles 14 to only those vehicles 14 that meet the filter requirements, and only those vehicles 14 that meet the conditions and parameters selected would be displayed to the user 12 as being available for selection and engagement.

Typically, each vehicle 14 would be equipped with a DVES beacon 22, as illustrated in FIG. 1. More particularly, the DVES beacons 22 could be mounted on the roof, a short mast, or other high point of each vehicle 14 to maximize the transmission range of the beacon signal. The use of an internal beacon heating system would allow unimpaired beacon transmissions during freezing weather conditions. The DVES beacon 22 may also be used to digitally transmit various other statuses, ID, data, pricing information, or other indications via additional modulated data fields that can be read by the mobile device 16 camera(s) or receiver(s). For example, trip conditions and parameters can be transmitted from the DVES beacon 22 along with the availability signal so that a user 12 can identify and select a vehicle 14 according to a specific trip need. As a result, the DVES 10 in accordance with the present disclosure has the capability to transmit multiple sequential data fields during each transmission cycle.

Figure 3:
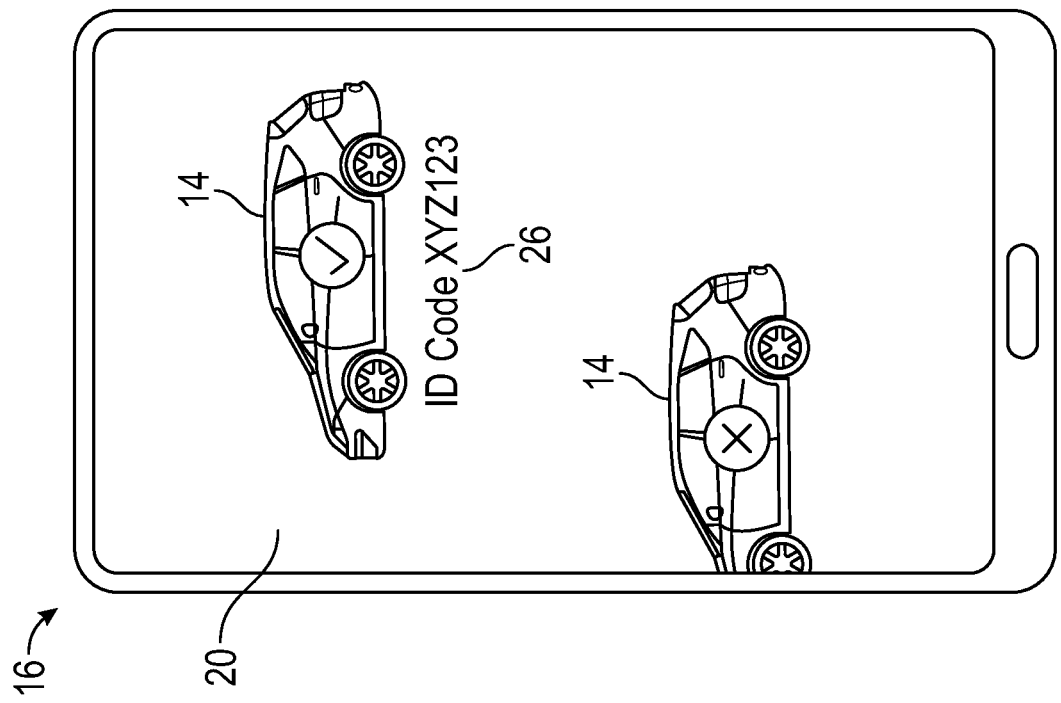
FIG. 3 is another exemplary representation of the screen of a user mobile device illustrating additional use of the DVES in accordance with the present disclosure.

In a preferred embodiment of the "Ad-hoc" Mode of the DVES 10, all that is necessary for a user 12 to preliminarily engage a particular vehicle 14 of interest would be for the user 12 to tap on the handheld touch-screen 20 of the user mobile device 16 at, or over, the image of the vehicle 14 of interest (Block 130), as displayed on the screen 20 during the application "search" mode, e.g. as shown in FIG. 2. Such selection may also be accomplished by using other selection gestures, such as by utilizing a single tap or press, a double tap or press, or a press held for a certain duration over the image of the desired vehicle 14, i.e. through any desired type of user input. Upon any appropriate selection gesture being accomplished, the DVES application 18 would then change from the "search" mode to the "engagement" mode (Block 140), with the handheld screen graphical treatment changing to highlight only the just-selected vehicle 14, which is now displaying a unique ID code 26 for the vehicle 14 on the user mobile device 16, for example, next to the vehicle's image on the mobile device display screen 20, e.g. as shown in FIG. 3. At the same time, all other vehicles 14 displayed on the screen 20 of the mobile device 16 would be "greyed out" as not being selected for engagement.

In preferred embodiments of the DVES 10, the user can formally engage the selected vehicle 14 by confirming the unique vehicle ID code 26 using the user mobile device 16 (Block 155). For example, the user mobile device 16 can transmit an acceptance of the unique vehicle ID code 26 back to the vehicle 14 as a confirmation. Alternatively, the selected vehicle 14 can be directly engaged using optical means associated with the user mobile device 16 to interact with an optical scanner in or outside the selected vehicle 14 for optical recognition of an image displayed on a display of the mobile device 16, e.g. a bar code, QR code, or the like. Still further, the selected vehicle 14 can be engaged using any kind of known radio frequency (RF) transmission means associated with the user mobile device 16 to interact with an RF receiver on the selected vehicle 14. The exchange with an optical scanner or an RF receiver on the selected vehicle 14 can include provision of the unique vehicle ID code 26 to verify the vehicle engagement. Thus, the selected vehicle 14 may be configured to receive the unique vehicle ID code (or confirmation code) 26 from the mobile device 16 through wireless radio communication, from the mobile device 16 through optical recognition, and/or from the user 12 by manual input through an interface on or in the vehicle 14.

At the point of initial selection of a particular vehicle by a user (i.e. preliminary engagement), several associated actions may also be triggered. First, the vehicle's beacon transmission status as displayed on the selecting party's screen would instantly (or substantially instantly) change from indicating an "I am available" signal to instead, indicating the vehicle's confirmation ID code 26, while simultaneously (or substantially simultaneously) removing the vehicle 14 from showing up as "available" on any other handheld device screen 20 that may be functioning in a DVES search mode (Block 160). This initial selection process by the user 12 may also cause any in-motion vehicle 14 that has been selected for hire to immediately (or substantially immediately) come to a stop (or provide an instruction to stop) at the nearest appropriate location for passenger pickup (Block 165), and start a timer for the user to enter an appropriate confirmation in order to formally engage the vehicle 14 (Block 175) within a predetermined amount of time. In accordance with preferred embodiments, the timer can be pre-set—for example, at 120 seconds. That is, once the timer starts, the user has 120 seconds in which to enter a confirmation code or otherwise formally engage the vehicle 14 for confirmation of a trip arrangement (e.g., by optical scan or RF transmission) (Block 180). If the confirmation code is entered by an appropriate means, then the trip can begin (Block 190). If the timer exceeds 120 seconds without such a confirmation, then the vehicle beacon 22 reverts to again showing the vehicle 14 as being "available" (Block 185). For driven vehicles, the DVES 10 will trigger an audible and visual "vehicle engaged" alert for the driver to allow them to pull over at the nearest safe spot, just like a taxicab would do if physically hailed. In the case of autonomous vehicles, the vehicle would similarly pull over and may engage its four-way flashers during the pendency of the fare physically finding and entering the vehicle.

If the vehicle 14 that is selected is already parked in an appropriate pickup location, it may also wait a pre-determined length of time for the hailing party to finalize the engagement (or formally engage the vehicle)—such as by: entering the vehicle 14; electronically or manually providing the unique vehicle ID code 26; interacting with an optical scanner; and/or interacting with an RF receiver—before the vehicle 14 reverts back to an "available" status (Block 185).

The actual trip information data input of the DVES selection/engagement process can take several forms, with the preferred and fastest method requiring just the selection of a pre-loaded destination that has already been stored on the user mobile device 16 running the DVES application 18 to be transmitted to the selected vehicle 14, along with the stored user and billing information. Alternatively, the user 12 can manually enter the destination information after the initial vehicle selection. Upon selecting the desired destination, either from a saved list or manually entering it into the application 18, the user mobile device 16 sends a burst transmission to the vehicle 14 confirming the selected vehicle's unique ID code 26, as well as sending all of the needed pertinent trip and billing information which would be necessary to effectuate the desired trip (Block 150). The user 12 then approaches the selected vehicle 14, and then scans the user mobile device's screen 20 (that has started displaying a QR or other information code) in front of an optical reader that is mounted either inside and/or outside the vehicle 14. Optionally, a user could enter the unique vehicle ID code 26 manually on a keypad located on or in the vehicle 14. Optionally, other methods such as voice input may be used to effectuate the engagement of a vehicle 14 by inputting a user ID code 26 and destination if the user mobile device 16 fails or if desired.

If the selected vehicle 14 is within the desired geographical proximity to the user 12 but not immediately apparent to the user 12, then the DVES application 18 can include a vehicle locator mode to assist and direct the user 12 to the selected vehicle 14 (Block 170), with an annotated screen similar to the "search mode" screen wherein the engaged vehicle is highlighted or annotated.

In embodiments according to the present disclosure, there is no communication needed between the user 12 and a central or off-site assignment system in order to initially or preliminarily engage a vehicle or set up a trip request. Instead, the user 12 deals directly with any available, unassigned vehicles 14. More preferably, a user 12 can use the DVES application 18 on a user mobile device 16 to identify available vehicles 14, select a specific vehicle 14 from a group of available vehicles 14, and engage the selected vehicle 14 for a trip. In some embodiments, the user 12 can identify particular desired trip parameters (or filter parameters), including but not limited to, type of vehicle, size of vehicle, seating capacity of vehicle, seating configuration of the vehicle, available operating range of the vehicle, charge/gas level of the vehicle, or the existence of special accommodations (e.g., handicap accommodations), and use the DVES 10 in accordance with the present disclosure to identify available, unassigned vehicles 14 that also meet any such selected trip conditions or parameters.

With the DVES 10, any available, unassigned vehicle 14 that is proximate to a user 12 may be directly selected in real time, on the spot, with no need for the user 12 to communicate with a "third party" central/off-site control system, such as a Central Operations Center, in order to set up or effectuate a trip engagement. Communication with a third-party to eventually finalize the trip-transaction, e.g., such as payment, is not precluded by use of the DVES 10. With the DVES 10, the entire process for a trip engagement is entirely between the user 12 and any vehicle 14 selected by that user 12. There is no need for the user 12 to pre-arrange with a particular ride-hail service in order to have a specific vehicle sent to their location, and subsequently attempt to search for and identify the specific vehicle from amongst a plethora of other similar vehicles.

Figure 5:
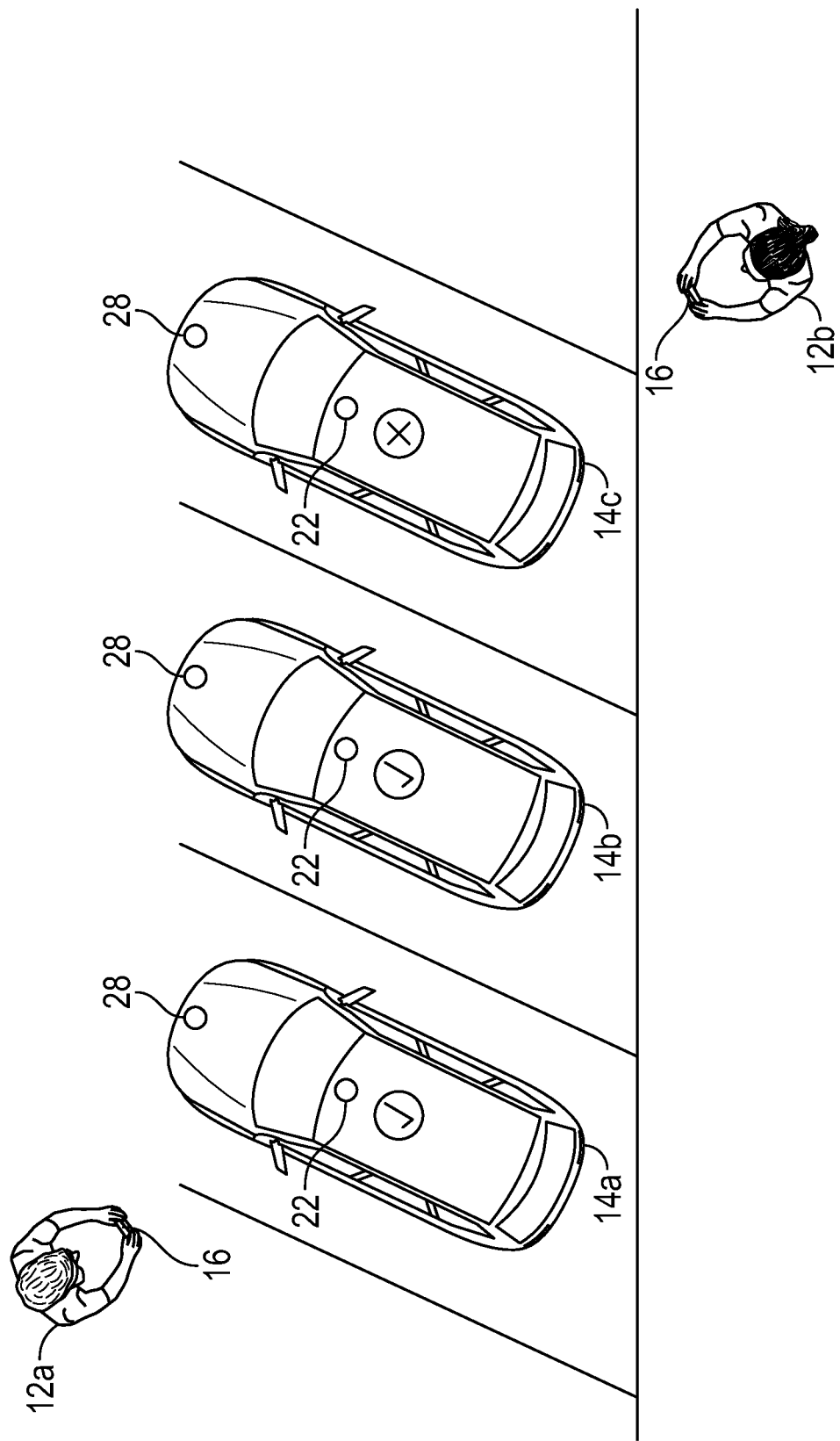
FIG. 5 shows an alternate set-up of the DVES in accordance with the present disclosure.
Figure 6:
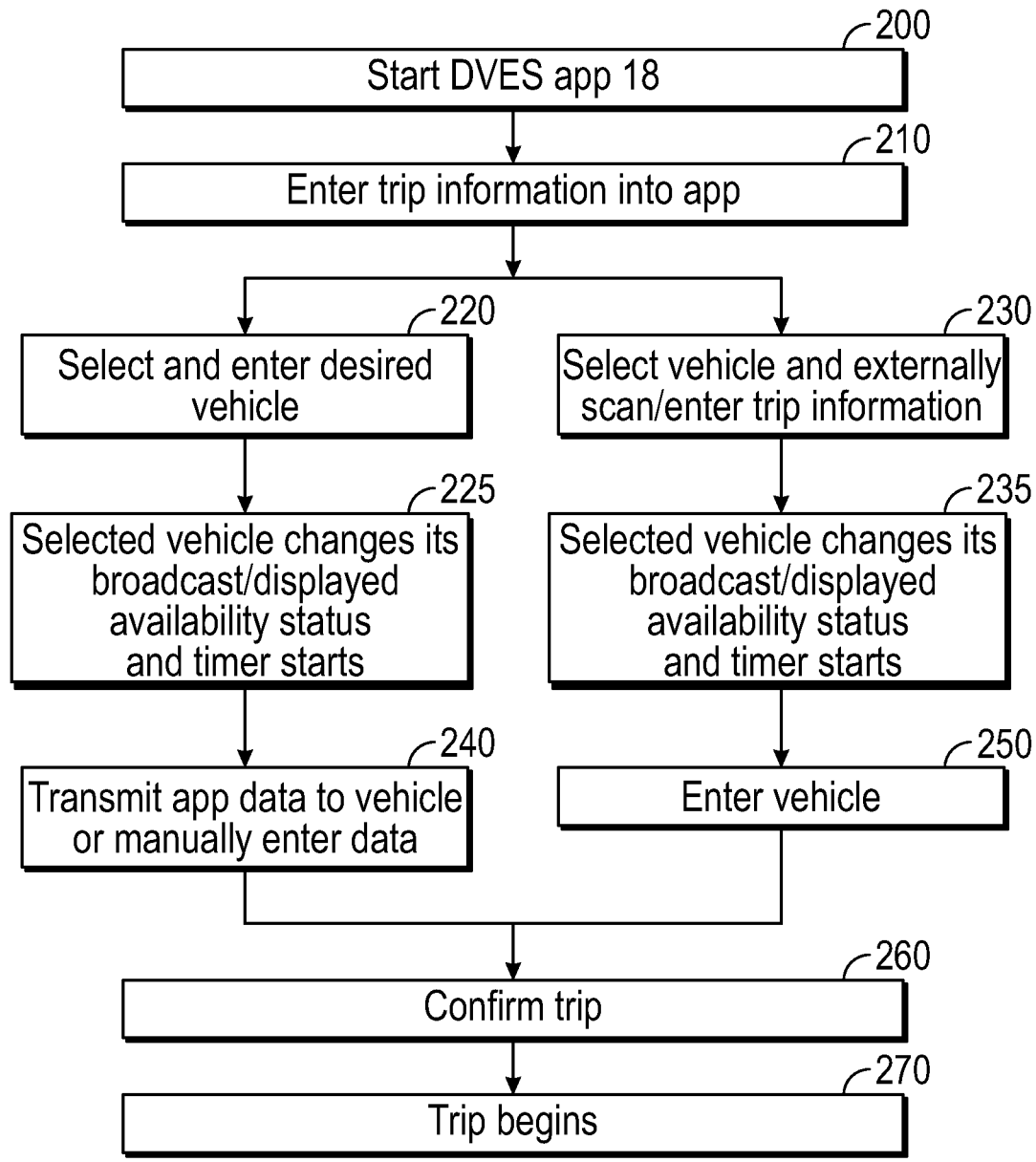
FIG. 6 is an exemplary flow diagram describing operation of the DVES in a "Queue" Mode in accordance with the present disclosure.

In an alternate embodiment of the DVES 10, a "Queue" Mode, shown in FIG. 5 and operating in accordance with the exemplary flow diagram shown in FIG. 6, can be utilized for vehicle engagement. By utilizing the "Queue" Mode, regardless of whether DVES-equipped vehicles 14 pre-position themselves in a formal line analogous to a traditional taxi cab stand, or cluster themselves as part of a waiting group of available vehicles 14, end users 12 may directly and spontaneously engage any desired vehicle 14 waiting in such a queue rather than being limited to selecting just the first vehicle in line.

In accordance with preferred operation in the "Queue" Mode, the user 12 accesses the DVES application 18 to start the selection/engagement process (Block 200). The user 12 inputs trip and/or billing information into the DVES application 18 (Block 210). Then, instead of searching for available, unassigned vehicles 14, as with the "Ad-hoc" Mode described above, the user 12 can find available vehicles 14 at pre-designated locations, such as queue lines outside airports, bus stations, train stations, sporting events, concerts, malls, or any other highly populated locations. The application 18 could still assist the user 12 to confirm availability status of a vehicle 14 in the queue so as to ensure that another user 12 has not already claimed a particular vehicle 14. Once confirmed, the user 12 can engage the available vehicle 14 through a variety of means.

With the "Queue" Mode, in addition to a vehicle 14 broadcasting an informational signal via the beacon 22, or via another portion of the vehicle 14, the vehicle 14 could also display a visible indication 28, such as a green light to indicate availability status, or a red light to indicate an unavailable status. In this regard, a user 12 can hire the vehicle 14 without using the DVES application 18 or even needing a user mobile device 16. In effect, all that is required for a user 12 to engage a vehicle 14 is for the user 12 to walk up to and open the door of any vehicle 14 that is showing a green light/available beacon status (Block 220). Once an idle/available vehicle 14 senses (or detects) that a door to that vehicle 14 has been opened and/or an occupancy sensor indicates that one or more people have entered the vehicle 14, the vehicle 14 could immediately change its availability status and color indication to "unavailable" to preclude a duplicate engagement attempt by another user 12 for a set period of time after the start of a timer (Block 225).

To effectuate the vehicle engagement in accordance with an alternate approach, a user 12 merely needs to hold the user mobile device 16 against a "near-field" antenna on or in a vehicle 14 to transmit a burst transmission from the DVES application 18 to the vehicle 14 which transmits salient trip information, such as the desired destination address that the vehicle 14 needs to go to, as well as other pertinent information that is needed or desired to execute a trip engagement request (Block 240).

Optionally, trip information can be provided from the user mobile device 16 via RF transmissions that are picked up by an RF receiver associated with the vehicle 14, or the user 12 can simply manually enter appropriate trip information and other optional information such as billing data, such as via a touch-screen on the vehicle 14, or by voice input. Still further, the user 12 can hold the user mobile device 16 under an optical reader or scanner on the vehicle 14 which, through a QR or other commonly used visible codes, allows salient trip information to be instantly entered into the DVES 10 (Block 230).

Once a vehicle 14 in the queue is selected and preliminarily engaged, the selected vehicle 14 changes its status automatically to "unavailable" by adjusting the beacon availability signal and also changing its visible indication (e.g., from green to red) for a set period of time after the start of a timer (Block 235). Thereafter, the user 12 confirms the trip information with the vehicle 14 (Block 260), and the trip begins (Block 270).

It is envisioned that as traditional parking lots for private vehicles become less and less necessary due to the increased adoption of "for-hire" vehicles, increasingly large areas will be designed and designated to more efficiently hold and/or queue such available vehicles for use by departing patrons. By properly designing the queue "lines" or areas, any newly engaged vehicle 14 may immediately get underway regardless of their place in a queue, lineup, or mobility status of other nearby vehicles 14 by the use of diagonal or perpendicular parking spaces designs, as shown in FIG. 5.

In addition to vehicles 14 electronically advertising their "available for-hire" status, the beacon 22 may also contain a visible indication that through color change or other visible alterations would convey its "availability" status. For those situations where a user 12 may not have access to a working user mobile device 16, and thus not have immediate access to the DVES application 18, the DVES 10 may be configured to accept all information entered manually via a touch-screen or keypad on and/or in the vehicle 14, as well as be equipped with a credit-card reader for billing purposes. To accommodate "walk up" trip requests, the user 12 touching or pulling an available vehicle's door handle could cause the vehicle 14 to immediately be placed in a temporary engaged status condition for a pre-set period of time. If the vehicle's 14 doors are not opened and/or the vehicle's seat occupancy sensors do not detect any occupancy, then the vehicle 14 would automatically revert back to an "available" status condition and transmit such availability information accordingly.

In the case of a multi-passenger party comprised of multiple persons desiring several sequential trip termination destinations, the trips can be ad-hoc preconfigured in toto, or multiple stored locations can be selected and added from an address book, or alternately entered and transmitted to the vehicle 14 prior to formal engagement. The DVES 10 in accordance with the present disclosure could also be capable of splitting up a fare amount equally amongst several passengers, or by proportionally allocating the cost of trip segments in the case of multiple drop-off locations, or charged entirely to a primary user 12 regardless of the number of destination locations, the decision of which can be pre-determined prior to the formal engagement of the vehicle 14 to maximize efficiency.

Additional drop-off locations may also be dynamically added during the pendency of a trip.

Optionally, when weather conditions or other local factors limit the visual range of a handheld device, the DVES application 18 may show a list of nearby available vehicles (filtering allowed) with selection accomplishable for a vehicle that is not yet within a visible range to the handheld device. In this case, a selection may be made by choosing a vehicle from the list. The list may highlight and/or annotate the vehicles on the list based on the filter parameters as discussed above. Although a preliminary selection of a particular vehicle may be made while it is outside the immediate area to the hailing party (or visually perceptible area), which will remove the vehicle further showing an "available for hire" status for all users other than the engaging user, the actual engagement would only take place once the selected vehicle was within the visible range. Upon initial selection of a vehicle, the geographic coordinates of the engaging party (user) would be transmitted to either the driver of the selected vehicle in the case of a 'driven' vehicle, or to the vehicle's navigation system in the case of an Autonomous Vehicle. For those situations beyond the range of optical and/or short-range radio-frequency transmissions, both the vehicles as well as the mobile devices running the DVES application may utilize cellular or other known communications networks to transfer data, along with GPS or other commonly used location data to exchange instantaneous location data (i.e. real-time location data).

The systems and devices disclosed herein may be computer controlled systems and devices having the necessary electronics, computer processing power, interfaces, memory, hardware, software, firmware, logic/state machines, databases, microprocessors, communication links, displays or other visual or audio interfaces, to provide the functions or achieve the results described herein.

The foregoing description of embodiments of the present invention has been presented for the purpose of illustration and description. It is not intended to be exhaustive or to limit the invention to the form disclosed. Obvious modifications and variations are possible in light of the above disclosure. The embodiments described were chosen to best illustrate the principles of the invention and practical applications thereof to enable one of ordinary skill in the art to utilize the invention in various embodiments and with various modifications as suited to the particular use contemplated.

What is claimed is:

1. A direct vehicle engagement system comprising:
a beacon associated with a vehicle; and
a mobile device;
wherein the beacon is configured to transmit an availability status signal, the availability status signal indicating whether the vehicle is available for hire or not available for hire; and
wherein the mobile device is configured to receive the availability status signal; and
wherein the mobile device comprises a camera and a display, wherein the mobile device is configured to dynamically display a video on the display based on detections by the camera.

2. The direct vehicle engagement system according to claim 1, wherein the display is a touch-screen, and wherein the mobile device is configured to preliminarily engage the vehicle for hire when the vehicle is selected by a user on the touch-screen.

3. The direct vehicle engagement system according to claim 2, further including a receiver associated with the vehicle, wherein the receiver is configured to receive a confirmation code for formal engagement.

4. The direct vehicle engagement system according to claim 3, wherein the receiver is configured to receive the confirmation code from the mobile device through wireless radio communication, from the mobile device through optical recognition, or from the user by manual input through an interface on or in the vehicle.

5. The direct vehicle engagement system according to claim 1, wherein the mobile device is configured to highlight and/or annotate the vehicle in the display based on the availability status signal.

6. The direct vehicle engagement system according to claim 1, wherein the beacon is configured to transmit a company affiliation of the vehicle, and wherein the mobile device is configured to annotate the vehicle on the display with the company affiliation.

7. The direct vehicle engagement system according to claim 1, wherein the mobile device is configured to store a filter parameter, and wherein the mobile device is further configured to grey out or disregard the vehicle on the display based on the filter parameter.

8. The direct vehicle engagement system according to claim 7, wherein the filter parameter is a destination address.

9. The direct vehicle engagement system according to claim 7, wherein the filter parameter is a type of vehicle, a category of vehicle, a size of vehicle, a seating capacity of vehicle, a seating configuration of vehicle, an available operating range of vehicle, a charge level of vehicle, a gas level of vehicle, or an existence of a special accommodation.

10. The direct vehicle engagement system according to claim 1, wherein the mobile device is configured to directly receive the availability status signal transmitted by the beacon associated with the vehicle.

11. A direct vehicle engagement system comprising:
a beacon associated with a vehicle; and
a mobile device;
wherein the beacon is configured to transmit an availability status signal, the availability status signal indicating whether the vehicle is available for hire or not available for hire;
wherein the mobile device is configured to receive the availability status signal; and
wherein the beacon is configured to transmit the availability status signal as a digitally modulated infra-red and/or visible signal.

12. A direct vehicle engagement system comprising:
a beacon associated with a vehicle; and
a mobile device;
wherein the beacon is configured to transmit an availability status signal, the availability status signal indicating whether the vehicle is available for hire or not available for hire;
wherein the mobile device is configured to receive the availability status signal; and
wherein the mobile device is configured to transmit an engagement signal to the vehicle through radio frequency transmission to hire the vehicle if the availability status signal indicates that the vehicle is available for hire.

13. The direct vehicle engagement system according to claim 12, wherein the beacon is configured to change the availability status signal to indicate that the vehicle is not available for hire by a device other than the mobile device upon receiving an engagement signal sent by the mobile device, and change the availability status signal to indicate that the vehicle is available for hire if a trip arrangement is not confirmed within a predetermined amount of time.

14. A direct vehicle engagement system comprising:
a mobile device;
a plurality of beacons, each beacon being associated with a vehicle;
wherein the beacon is configured to transmit an availability status signal, the availability status signal indicating whether the vehicle is available for hire or not available for hire;
wherein the mobile device is configured to receive the availability status signal;
wherein each beacon is configured to transmit an availability status signal, the availability status signal indicating whether the respective associated vehicle is available for hire or not available for hire; and
wherein the mobile device is configured to receive each availability status signal within a select range.

15. The direct vehicle engagement system according to claim 14, wherein the mobile device is configured to directly engage a desired vehicle associated with the plurality of beacons based on a selection by a user if the availability status signal transmitted by the beacon associated with the desired vehicle indicates that the desired vehicle is available for hire.

16. A direct vehicle engagement system comprising:
a beacon associated with a vehicle; and
a mobile device;
wherein the beacon is configured to transmit an availability status signal, the availability status signal indicating whether the vehicle is available for hire or not available for hire;
wherein the mobile device is configured to receive the availability status signal; and
wherein the mobile device is configured to engage the vehicle for hire without communicating with a central operations center or third party intermediary for assignment of a trip to the vehicle.

17. A direct vehicle engagement system comprising:
a beacon associated with a vehicle; and
a mobile device;
wherein the beacon is configured to transmit an availability status signal, the availability status signal indicating whether the vehicle is available for hire or not available for hire;
wherein the mobile device is configured to receive the availability status signal; and
wherein the mobile device is configured to receive the availability status signal when the vehicle is not visible to a user from the position of the mobile device.

18. The direct vehicle engagement system according to claim 17, wherein the mobile device is configured to preliminarily engage the vehicle when the vehicle is not visible from the position of the mobile device.

19. A direct vehicle engagement device comprising:
a mobile device comprising a display; and
a camera;
wherein the mobile device is configured to receive an availability status signal transmitted from a beacon of a vehicle; and
wherein the mobile device is configured to dynamically display a video on the display based on detections by the camera, and wherein the mobile device is configured to highlight and/or annotate the vehicle on the display based on the availability status signal.

20. The direct vehicle engagement device according to claim 19, wherein the mobile device is configured to highlight the vehicle on the display green if the availability status signal indicates that the vehicle is available for hire, and/or wherein the mobile device is configured to highlight the vehicle on the display red if the availability status signal indicates that the vehicle is not available for hire.

21. The direct vehicle engagement device according to claim 19, wherein the mobile device is configured to annotate the vehicle on the display with a check mark if the availability status signal indicates that the vehicle is available for hire, and/or wherein the mobile device is configured to annotate the vehicle on the display with an "X" if the availability status signal indicates that the vehicle is not available for hire.

22. The direct vehicle engagement device according to claim 19, wherein the mobile device is configured to annotate the vehicle on the display with a company affiliation of the vehicle and/or with a category of vehicle.

23. The direct vehicle engagement device according to claim 19, wherein the mobile device is configured to directly receive the availability status signal transmitted by the beacon of the vehicle.

24. A method of directly engaging a vehicle in a direct vehicle engagement system comprising:
transmitting, by a plurality of beacons each associated with a respective vehicle, an availability status signal, each availability status signal indicating whether the respective vehicle is available for hire or not available for hire;
receiving, by a mobile device, the availability status signal of each beacon of the plurality of beacons;
selecting, by a user of the mobile device, a desired vehicle indicated as being available for hire by the availability status signal transmitted by the beacon of the desired vehicle;
preliminary engaging, by the mobile device, the desired vehicle for hire; and
transmitting, by the beacon of the desired vehicle, a not available for hire availability status signal after the preliminary engaging;
wherein the not available for hire availability status signal indicates that the desired vehicle is not available for hire by a device other than the mobile device.

25. The method of directly engaging a vehicle in a direct vehicle engagement system according to claim 24, wherein in the receiving step, the mobile device receives the availability status signal directly from each beacon of the plurality of beacons.

\* \* \* \* \*